(12) United States Patent
Emejulu et al.

(10) Patent No.: US 10,749,825 B2
(45) Date of Patent: Aug. 18, 2020

(54) EMAIL COST ANALYTICS

(71) Applicant: International Business Machines Corporation, Armonk, NY (US)

(72) Inventors: Nnaemeka I. Emejulu, Austin, TX (US); Andrew J. Lavery, Austin, TX (US); Mario A. Maldari, Longmont, CO (US); Karthikeyan Ramamoorthy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1360 days.

(21) Appl. No.: 14/699,135

(22) Filed: Apr. 29, 2015

(65) Prior Publication Data

US 2016/0323220 A1    Nov. 3, 2016

(51) Int. Cl.
*G06Q 10/06* (2012.01)
*G06Q 10/10* (2012.01)
*H04L 12/58* (2006.01)

(52) U.S. Cl.
CPC ....... *H04L 51/08* (2013.01); *G06Q 10/06313* (2013.01); *G06Q 10/107* (2013.01); *H04L 51/14* (2013.01); *H04L 51/066* (2013.01)

(58) Field of Classification Search
None
See application file for complete search history.

(56) References Cited

U.S. PATENT DOCUMENTS

| | | | |
|---|---|---|---|
| 7,865,384 B2 | 1/2011 | Anderson et al. | |
| 7,930,357 B2 | 4/2011 | Malik | |
| 8,423,623 B2 | 4/2013 | Li et al. | |
| 8,458,269 B2 | 6/2013 | Friedman et al. | |
| 8,527,608 B2 | 9/2013 | Wilson | |
| 8,949,361 B2 | 2/2015 | Nicolaou et al. | |
| 2002/0013854 A1 | 1/2002 | Eggleston et al. | |
| 2009/0048986 A1* | 2/2009 | Anderson | G06Q 10/063 705/400 |
| 2010/0223341 A1* | 9/2010 | Manolescu | H04L 51/32 709/206 |
| 2011/0022664 A1 | 1/2011 | Ainsworth | |
| 2011/0231501 A1 | 9/2011 | Swamidass | |

(Continued)

FOREIGN PATENT DOCUMENTS

| | | |
|---|---|---|
| WO | 2000067133 A1 | 11/2000 |
| WO | 2004036853 A1 | 4/2004 |

(Continued)

OTHER PUBLICATIONS

IBM, "System and method for optimizing disk space and network bandwidth utilization in electronic mail distribution," ip.com, An IP.com Prior Art Database Technical Disclosure, Jun. 17, 2008 (Year: 2008).*

(Continued)

*Primary Examiner* — Amanda Gurski
(74) *Attorney, Agent, or Firm* — Kelli D. Morin

(57) ABSTRACT

Content of an email message may be analyzed, using natural language processing (NLP), to determine a subject matter of the email message. A cost estimate may be generated for sending the email message based on at least the subject matter of the email message. The cost estimate may be compared to a cost threshold. The cost estimate may be determined to exceed the cost threshold, based on the comparing.

14 Claims, 7 Drawing Sheets

(56) References Cited

U.S. PATENT DOCUMENTS

| | | | |
|---|---|---|---|
| 2012/0254335 A1 | 10/2012 | Martin et al. | |
| 2015/0067833 A1* | 3/2015 | Verma | H04L 63/1483 726/22 |
| 2015/0088997 A1* | 3/2015 | Van Dijk | G06Q 10/10 709/206 |

FOREIGN PATENT DOCUMENTS

| | | | |
|---|---|---|---|
| WO | 2007133504 A2 | 11/2007 | |
| WO | WO-2007133504 A2 * | 11/2007 | H04L 51/08 |

OTHER PUBLICATIONS

IBM, "System and method for optimizing disk space and network bandwidth utilization in electronic mail distribution," ip.com, An IP.com Prior Art Database Technical Disclosure, Original Publication Date Jun. 17, 2008, IP.com No. 000171700, IP.com Electronic Publication Jun. 17, 2008.

* cited by examiner

EMAIL COST ANALYTICS

BACKGROUND

This disclosure relates generally to email management, and more specifically, to generating cost estimates for sending particular email messages and determining whether the cost estimates exceed cost thresholds.

Email is the transmitting and receiving of computer-implemented electronic messages, which may be through a network. Before a user sends an email message from the user's computing device, the user's Mail User Agent (MUA) or web application (e.g., IBM® Notes®) may generate header information, such as the user's email address and date. An MUA is software that enables a user to generate, read, transmit, and receive email. The user may also generate information in the header, such as destination email addresses and the subject of the message. In addition to the user generating header information and the actual body of a message, the user may also attach one or more files (e.g., Portable Document Format (PDF) files) before sending the message to a destination address.

SUMMARY

One or more embodiments are directed to a computer-implemented method. The method may include analyzing, using natural language processing (NLP), content of an email message to determine a subject matter of the email message. The method may further include generating a cost estimate for sending the email message based on at least the subject matter of the email message. The method may also include comparing the cost estimate to a cost threshold. Moreover, the method may include determining, based on the comparing, that the cost estimate exceeds the cost threshold.

One or more embodiments are directed to a system. The system may include a computing device having a processor and a memory. The memory may store program instructions. The program instructions executable by the processor may cause the system to analyze, using natural language processing (NLP), content of an email message to determine a subject matter of the email message. The program instructions executable by the processor may further cause the system to generate a cost estimate for sending the email message based on at least the subject matter of the email message. The program instructions executable by the processor may also cause the system to compare the cost estimate to a cost threshold. The program instructions executable by the processor may cause the system to determine, based on the comparing, that the cost estimate exceeds the cost threshold.

One or more embodiments are directed to a computer program product comprising a computer readable storage medium. The computer readable storage medium may include program code embodied therewith. The program code may include computer readable program code configured for analyzing, using natural language processing (NLP), content of an email message to determine a subject matter of the email message. The computer readable program code may further be configured for generating a cost estimate for sending the email message based on at least the subject matter of the email message. The computer readable program code may also be configured for comparing the cost estimate to a cost threshold. The computer readable program code may further be configured for determining, based on the comparing, that the cost estimate exceeds the cost threshold.

Figure 1:
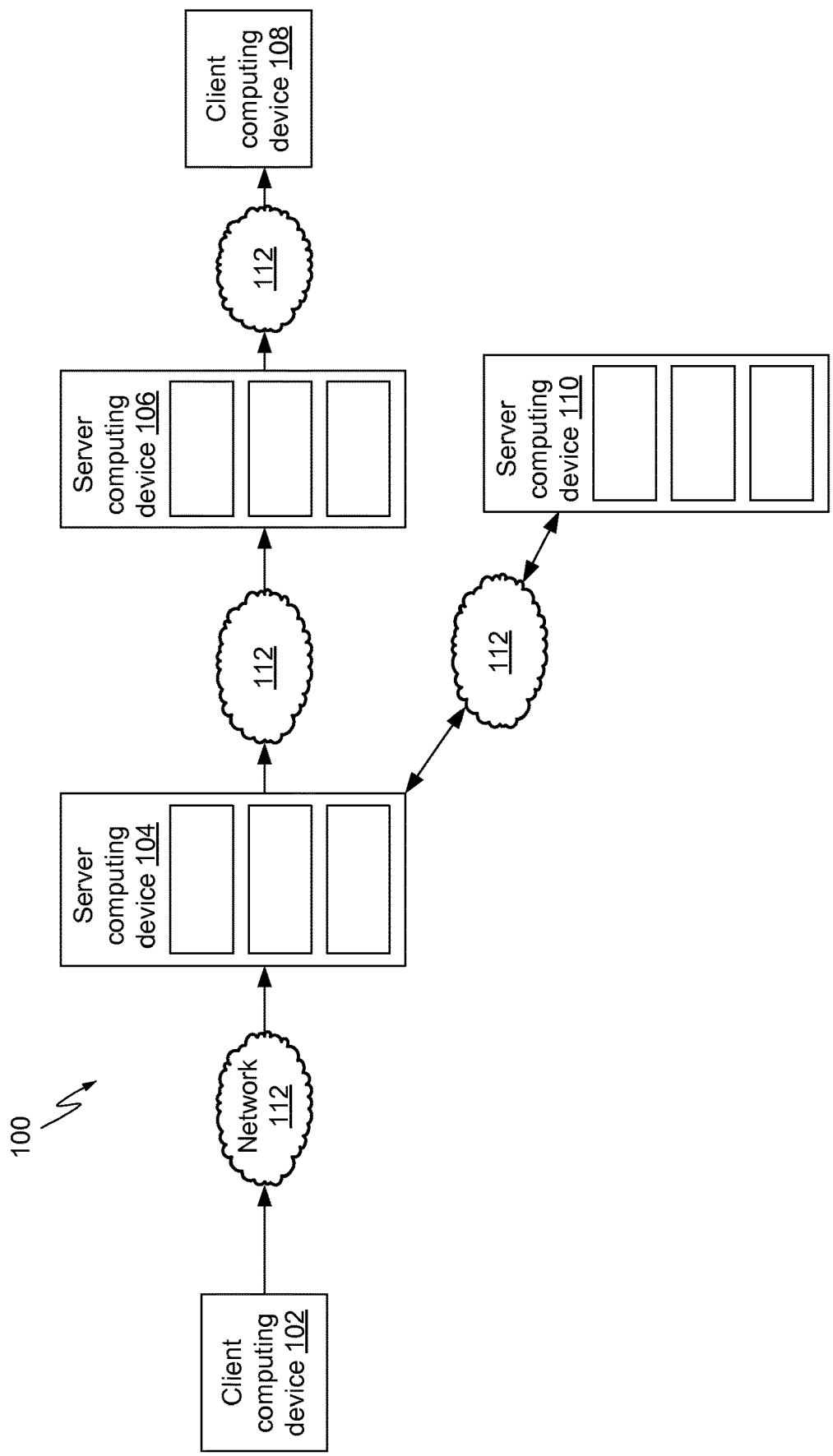
FIG. 1 is a block diagram of an example email computing environment, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to email management, and more specifically, to generating cost estimates for sending particular email messages and determining whether the cost estimates exceed cost thresholds. While the present disclosure is not necessarily limited to such applications, various aspects of the disclosure may be appreciated through a discussion of various examples using this context. The term "email message," "email," "message," or the like as disclosed herein, may refer, in some cases, to the actual text of the email message (e.g., body and header information) and one or more attached files (e.g., PDF, Word, etc.).

Sending an email message with one or more large attached files (e.g., 10 MB) to several people may result in extensive costs, such as opportunity costs and direct monetary costs. For example, costs may include network bandwidth costs, long term monetary storage costs, time a person spends waiting for the attached file(s) to download in order to view the file(s), and time a person spends managing his or her email account (e.g., searching for large email attachments to delete in order to be under an email storage quota). Users, such as employees, may be unaware of the costs they are creating when sending email messages. Accordingly, if employees or businesses are aware of the potential costs they are creating, they may be willing to use alternative ways to send, receive, and/or store their email messages to mitigate the costs.

One solution may be to cap the size of emails that can be sent. However, this may only prevent a user from sending large attachments but does not prevent the user from sending smaller sized emails to many users, which may be just as costly. Moreover, limiting the size of attachments may prevent users from sending large attachments that are needed for legitimate business reasons. Some solutions may provide program tools to allow users to store email attachments to a local database, as opposed to an email server-side storage database. However, email servers may still have to store the attachment files for all users until such attachment files are viewed by all applicable users. Consequently, many users may either not be aware of such tools or they may fail to consistently use the tools, which may result in little or no cost savings.

Some solutions may allow for cost-based calculations, but may fail to adequately take into account various important and dynamic factors. For example, solutions may not analyze email content using natural language processing (NLP), utilize the changing costs of storage as a cost factor, or utilize the recipient of the email as a cost factor. Accordingly, embodiments of the present disclosure may be directed to analyzing, using natural language processing (NLP), content of an email message to determine a subject matter of the email message. Embodiments may also be directed to generating a cost estimate for sending the email message based on at least the subject matter of the email message. Further, embodiments may be directed to comparing the cost estimate to a cost threshold. Moreover, embodiments may be directed to determining, based on the comparing, whether the cost estimate exceeds the cost threshold.

FIG. 1 is a block diagram of an example email computing environment 100, according to embodiments. The email computing environment 100 may include a first client computing device 102 (e.g., a sending user's laptop), one or more server computing devices 104, 106, and 110, a second client computing device 108 (e.g., a recipient's personal computer), and a network 112. In some embodiments, the email computing environment 100 may be the cloud computing environment 50 of FIG. 6 (or included in the cloud computing environment 50). In some embodiments, the client computing devices 102, 108, and/or the server computing devices 104, 106, and 110 may be configured the same or analogous to the computer system/server 12, as specified in FIG. 5. In some email computing environments 100, there may only be one common server computing device that services both sending users and recipient users.

In embodiments, the client computing device 102 may initiate an email message transmission. Accordingly, a sending user may open a Mail User Agent (MUA) application on the client computing device 102, attach one or more files, specify header information (e.g., subject, destination of email message, etc.), generate text in the body of the email message, and send the email message to the proper destination.

In some embodiments, in response to the sending user utilizing the client computing device 102 by selecting a control button to send the email message, the server computing device 104 or 106 may generate a cost estimate for sending the email message, as described herein. If the cost estimate exceeds a cost threshold, the server computing device 104 or 106 may provide various cost mitigation options to the user, as described herein. In some embodiments, the cost estimate may be calculated as soon as one or more recipients are added to the destination address field (e.g., before a control button is selected to send the email message), as described in more detail herein.

Consistent with embodiments, the user may send the email message within various network 112 environments. For example, the network 112 may be an internal network, such as a Local Area Network (LAN), or a public network. Other specific networks 112 may include but are not limited to personal area networks (PAN), Metropolitan Area Networks (MAN), Wide Area Networks (WAN), Storage Area Networks (SAN), Enterprise Private Networks (EPN), Virtual Private Networks (VPN), or any other suitable networks.

In some embodiments, the server computing device 104 may receive an email message (e.g., via a Mail Transfer Agent (MTA)) from the client computing device 102. In embodiments, the server computing device 104 may correspond to the sending user's provider's server computing device.

In various embodiments, before the server computing device 104 routs the email message to the server computing device 106, the server computing device 104 may request an Internet Protocol (IP) address that corresponds to a domain name of a recipient user specified by the sending user on client computing device 102. The server computing device 104 may make such request by communicating with server computing device 110, which may be a Domain Name Server (DNS). The DNS may translate the domain name of the recipient user into a valid IP address.

In embodiments, the server computing device 104 may then transmit the email message to server computing device 106, which may correspond to the recipient user's provider's server computing device. In embodiments, the server computing device 106 may then transmit the email message to the recipient user's computing device—client computing device 108 (e.g., via Post Office Protocol (POP)).

Figure 2:
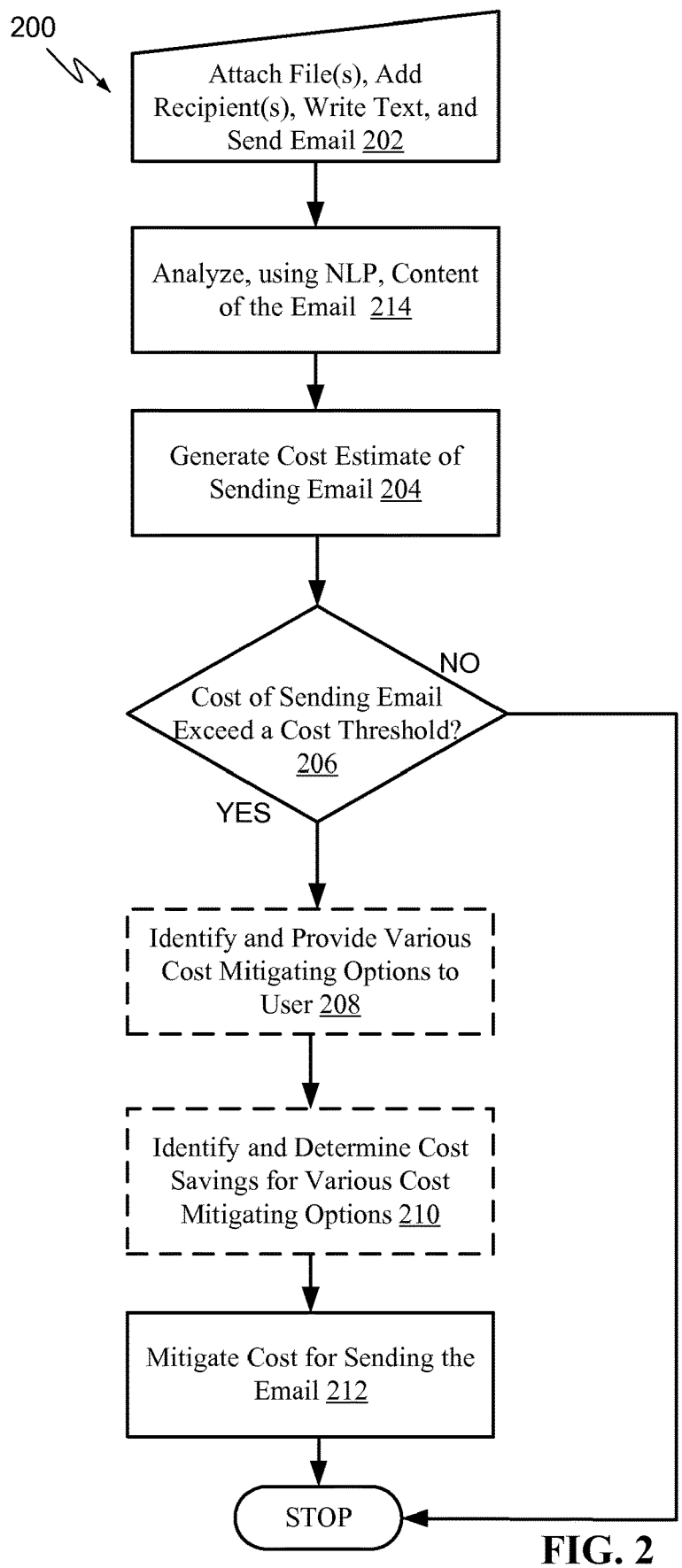
FIG. 2 is a flow diagram of an example process for determining whether sending an email message is above a cost threshold and mitigating the cost accordingly, with respect to embodiments.

FIG. 2 is a flow diagram of an example process for determining whether sending an email message is above a cost threshold and mitigating the cost accordingly, with respect to embodiments. The order of operations as illustrated by process 200 (including the order of operations of processes 300 of FIG. 3 or 400 of FIG. 4) are not limited to the order as shown, as these operations may occur in any suitable order. For example, operation 210 for identifying and determining a cost savings for various cost mitigating options may occur before operation 208 for identifying and providing various cost mitigation options to a user. In some embodiments, process 200 may be stored as program instructions and/or data in the memory 28 or of computer system/server 12 (FIG. 5), which may correspond to a user's provider's server computing device (e.g., server computing device 104).

The process 200 may begin when a user performs operation 202 to open an email application (MUA), attach one or more files to the email (e.g., PDF files, Joint Photographic Expert Group (JPEG) files, Visio files, etc.), add various recipients to the email, generate a body of the email, and select a control button to send an email.

In some embodiments, a sending user's server computing device may then perform operation 214 by analyzing, using NLP, content of an email message to determine a subject matter of the email message. NLP may be performed by a program module configured to understand human speech or written language. The program module may perform various methods and techniques for analyzing words and phrases (syntactic analysis, semantic analysis, etc.). The module may be configured to recognize and analyze any number of natural languages. In embodiments, module may parse passages of the applicable emails. Further, the module may include various submodules to aid NLP. These modules may encompass, but are not limited to, a tokenizers, part-of-speech (POS) taggers, semantic relationship identifiers, and syntactic relationship identifiers.

The term "subject matter," as disclosed herein may refer to an email message topic(s), purpose(s), and/or theme(s) or the like. In some embodiments, if the subject matter of an email is deemed to be within a particular vital category (e.g., board meeting subject matter), then the email may be less costly (or if costly for other reasons, be allotted a higher cost threshold). Alternatively, if the subject matter of an email is deemed to be within a trivial category (e.g., practical joke subject matter), then the email may be more costly (or if less costly because of other reasons, be allotted a lower cost threshold). For example, any subject matter dealing with intellectual property may be deemed to not be costly at all such that any of these emails may be sent at any time. Continuing with this example, NLP may be programmed to identify key words within the email message, such as "IP," "patents," "trademarks," "copyrights," etc., which may be used to make algorithmic inferences that an email message includes a particular purpose, importance, subject, theme, or the like.

In some embodiments, the sending user's server computing device program module may perform operation 204 to generate a cost estimate for sending the email based on at least the subject matter of the email message. For example, the client computing device may determine subject matter costs along with email size costs, recipient storing history costs, sender and recipient occupational roles costs, dynamic resource costs, email document type costs, or any other costs, as described herein.

In operation 206, a server computing device may determine whether the generated cost estimate exceeds a cost threshold by comparing the generated cost estimate to the cost threshold. In some embodiments, when the cost estimate exceeds the cost threshold, the cost of sending the email is above some predefined acceptable cost (e.g., a model cost) as represented by a number value. In some embodiments, the cost threshold is based on a model cost of what the email should ideally cost given various dynamics surrounding the email message. For example, any email message sent by a Chief Executive Officer (CEO) of a company may have a relatively high cost threshold or no threshold (or no associated costs) because his or her communications may be vital to the company's success. Alternatively, a new employee whose responsibilities include a small quantity of email communication may consequently have a relatively low cost threshold (or the new employee's emails may be costly). In some embodiments, the cost threshold may be based on a flat numerical value that does not take into account the various dynamics as described above. In some embodiments, the cost threshold may be based on an average cost of other emails sent (e.g., within a company, for a given job description, etc.). For example, if the average cost of sending an email for all 20 employees within a given business unit is 100, then 100 might be the cost threshold.

The cost threshold may be any suitable value based on different cost units. For example, a computing device (e.g., server computing device 104) may determine cost threshold numerical values that correspond to actual monetary costs. In an illustrative example, an email message may be determined to be above a cost threshold if the monetary cost of sending the email surpasses 80 dollars. In another illustrative example, an email message may be determined to be above a cost threshold if the cost of sending an email exceeds an arbitrary number (e.g., 100). In these embodiments, a sending user's provider server (e.g., server computing device 104) may include a program module and a rules database that specifies a system for calculating costs. For example, the cost of being a new employee with no duties for communication may be 80, and the cost of sending an email between 7 a.m. and 10 a.m. may be 30. The server may both determine that the cost threshold is 100, and that the user has surpassed the cost threshold with a value of 110 by being a new employee and sending the email between 7 a.m. and 10 a.m. (because 80+30=110).

In operation 206, if the cost of sending the email message is not above a cost threshold, then the process 200 may end. In other embodiments, a computing device (e.g., server computing device 104) may transmit a message to the sending user's computing device (e.g., client computing device 102) specifying that the cost of sending the email is not above a cost threshold, and that the user may accordingly proceed.

If the cost of sending the email is above a cost threshold, then a server computing device may perform operation 208 to identify and provide various cost mitigation options to a user. In some embodiments, a sending user's server computing device (e.g., server computing device 104) may transmit data to a sending client computing device (e.g., client computing device 102) such that the data is displayed as indicia on the client computing device display screen. The indicia may specify various cost mitigation options for mitigating the cost. For example, the indicia may specify that the sending user may queue the email for later transmitting, use a shared file server, compress email attachment file(s), etc. The computing device server may then receive a user request to perform at least one of the cost mitigation options. These cost mitigation options are described herein.

In some embodiments, the user may then select one or more of these cost mitigating options such that operation 212 is performed to mitigate (e.g., lower) the cost of sending the email. In some embodiments, the user may ignore the indicia and not choose any options. In other embodiments, the user must select at least one option. In some embodiments, the user may select one of a range of options that are deemed by a computing device to be the least costly or at least relatively less costly. For example, compressing an email and using a shared file server may each respectively save $50, but queueing the email may only save $5. Accordingly, a computing device (e.g., server computing device 104) may only allow the user to select the options of compressing an email or using a shared file server because these options save the most money. In these embodiments, operations 208 and 210 may combined, as discussed herein.

In some embodiments, a server computing device may be responsible for choosing which cost mitigation options that the sending user must utilize. In these embodiments, the server computing device may perform operation 210 by identifying and determining the cost savings for various mitigating options. Operation 210 may be performed in conjunction with operation 208 as described herein, or instead of operation 208. In an illustrative example, the sending user's provider server computing device may identify and determine a cost savings for: using a shared file server, compressing file attachment(s), using less monetarily expensive storage, etc. These cost saving determinations are described herein. In some embodiments, the computing server device may select the cost mitigation option that provides the most cost savings, and accordingly perform operation 212. In some embodiments, when a server computing device performs operation 212, the cost of sending the email may fall under the cost threshold such that the user may unabatedly send the email message. In some embodiments, one cost mitigation option may be to not send the email at all (e.g., because the subject matter is trivial and the sender's occupational role does not require communication).

Figure 3:
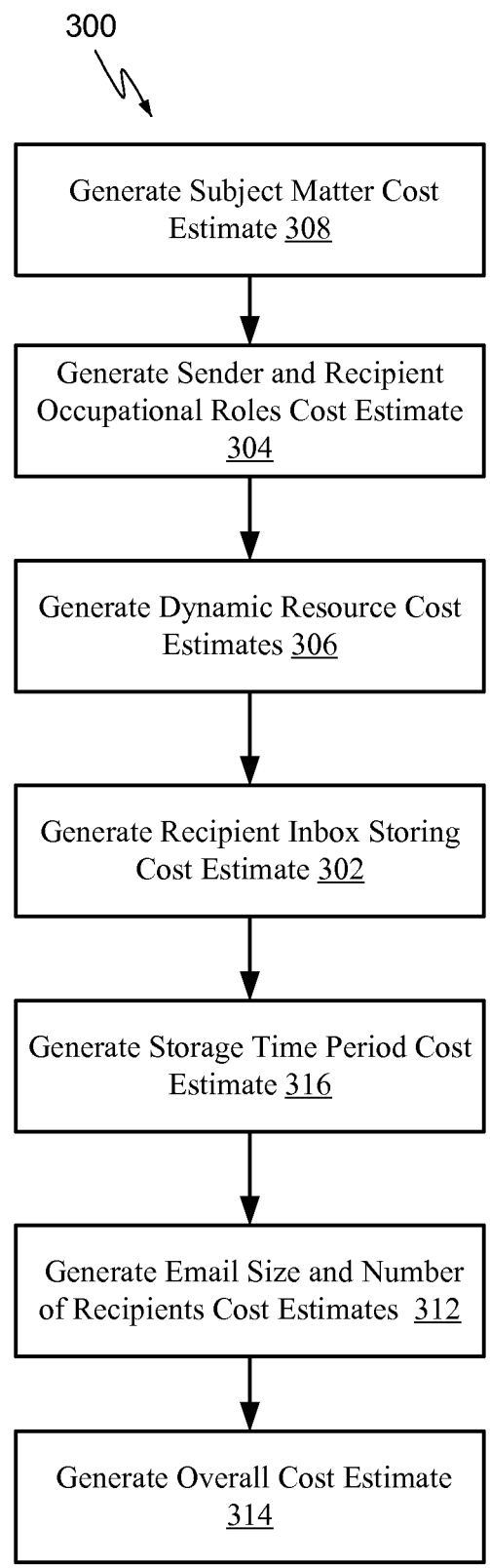
FIG. 3 is a flow diagram of an example process for generating a cost estimate for sending an email message, according to embodiments.

FIG. 3 is a flow diagram of an example process 300 for generating a cost estimate of sending an email message (e.g., per operation 204 of FIG. 2), according to embodiments. In some embodiments, the generating of the cost estimate may be a result of adding up various sub-costs (e.g., operations 308, 304, 306, 302, 316, and 312). In some embodiments, any of these determinations of costs as specified below may be performed via a program module and/or data stores of a server computing device (e.g., server computing devices 104 and/or 106, or within the memory 28 of computer system/server 12 of FIG. 5).

Process 300 may begin in some embodiments when a computing device (e.g., server computing device 104) performs operation 308 to generate a subject matter cost estimate. The subject matter cost estimate may be the result of a NLP module determining the subject matter of the email. As discussed above, in some embodiments, if the subject matter of an email is deemed to be within a particular category (e.g., emails regarding a particular business merger deal), then the email may be less costly as it may be important subject matter. Alternatively, if the subject matter of an email is deemed to be within another category (e.g., practical joke subject matter), then the email may be more costly. For example, any subject matter dealing with finances may not incur any costs such that any of these emails may be sent at any time. Continuing with this example, NLP may be programmed to identify key words within the email message such as "$1^{st}$ quarter earnings," "balance sheet," "liabilities," "assets," etc., which may be used to make algorithmic inferences that an email message includes a particular purpose, importance, subject, theme, or the like.

In operation 304, one or more computing devices (e.g., server computing device 104 and/or server computing device 106) may identify an occupational role of the sending and/or receiving user that is specified by the user's computing device, and generate a cost estimate based on the identification. Various users may have different roles within a company and may accordingly have different cost associated with sending particular emails (or different cost thresholds implemented), as described above. For example, a first user may be in charge of communications for a company and may consequently send a single email message to hundreds of people, which may occur on a frequent basis. Such emails may incur significant costs if sent by a new employee whose job does not require constant communication. However, as described above, because of these occupational roles, these users email messages may be less costly (or be allotted a higher cost threshold per email) than other users to allow them to efficiently perform their job duties.

In some embodiments, occupational roles of recipients may also be configured into the cost determination. For example, if two recipients of an email message were the general counsel of a company and the director of communications, costs for sending the email to these individuals may not be configured at all for these individuals, as any delay in receiving the email might impede their work duties within the company. Accordingly, for example, it may not matter if the general counsel stores a large quantity of large attachments to their server computing devices (which is usually costly), the email messages may still be sent. In some embodiments, even if the sending user's email is above a cost threshold, emails directed to a certain class of individuals (e.g., CEO, general counsel, etc.) may be automatically transmitted to increase efficiency.

A server computing device may be able to determine occupational roles in various manners. For example, each client computing device of a user (e.g., personal computer, laptop, etc.) may store a pre-registered ID in memory or on a storage device that represents a particular role of the user within a company (e.g., 001 to represent CEO). When the user selects a control button to send the email, the ID number may be transmitted to the corresponding server computing device (e.g., server computing device 104 or 106). The corresponding server computing device may include a data store of rules and policies that specify each role ID within the company and corresponding costs to send an email according to the role. For example, using the illustration above, a server computing device may receive the ID 001 from a user's client computing device. The server computing device may scan its data store for 001, and determine that no cost should be associated with sending the email as 001 or no cost should be associated receiving the email as 001.

In operation 306, one or more computing devices (e.g., server computing devices 104 and/or 106) may generate dynamic resource cost estimates. Dynamic resource costs, as described herein, mean the various monetary costs that may increase or decrease over time. For example, at a first time it may cost 85 dollars to store a particular email message. However, at a second subsequent time, a new storage solution may be implemented by a company, which reduces the cost to only 20 dollars to store that same email message. Therefore, a program module of the server computing device may adjust to this change and in some cases, an email that would have been above a cost threshold, is now under a cost threshold. Dynamic resources costs may take into account any suitable resource cost. For example, changing storage monetary costs, changing monetary network costs, changing occupational roles, changing occupational wages, etc.

A server computing device may perform operation 302 to determine a quantity of data that is stored to an email inbox of each of the named recipients of the email message and to generate a cost estimate based on the determined quantity. Operation 302 may give an indication of how various recipients of an email message have historically processed their emails, which may provide a predictable cost estimation of sending an email. For example, if most recipients of an email message process their email messages quickly by deleting the email message upon receiving them, the predicted storage cost may be reduced. Alternatively, if most recipients accumulate their email messages stored on their provider server computing devices, then the predicted storage cost may increase, as the provider server computing device may have to store and manage a large attachment file for many users (e.g., several employees within a business).

In some embodiments, a heuristic for generating the cost estimate of sending an email as it relates to operation 302 may be to calculate the average mailbox size of all of the recipient users. This calculation may give an indication of the general trend of email accumulation of all of the recipients of the email message. In some embodiments a sending user's server computing device program module may perform this calculation upon receiving each recipient's email inbox size from the recipient user's server computing device.

In some embodiments, operation 313 may be utilized to determine whether an email message is likely to be stored above a threshold time period and to generate a cost estimate based on the determining. In some embodiments, a program module within a server computing device (e.g., an NLP module) may be utilized to determine whether the email message is likely to be stored above a threshold time period.

In these embodiments, key words or phrases may be identified to make an inference that an email may be stored over a particular threshold time. For example, if a user included a large attachment and generated a message that reads "this email describes our annual policy for security, please read this carefully and keep this email for future reference." Continuing with the above example, NLP may identify key phrases such as "keep this email for future reference," and another program module may determine that the message is likely to be stored above a threshold time period. The threshold time period may be any suitable time period. For example, if the email is likely to be stored any longer than 1 day, 3, days, 1 week (or any other threshold time period), then the email message may be determined to be more costly. In these embodiments, a server computing device (e.g., server computing device 104) may include a data store of key words or phrases and corresponding policies associated with the key words. For example, using the illustration above, the phrase "keep this email for future reference" may be a phrase stored in a database that is associated with a message likely being stored over a 1 week threshold time period, which is associated with a cost of 100.

In other embodiments regarding operation 316, server computing devices may identify particular document attachment types that are associated with being stored above a threshold time period. For example, attachments within calendar invitation emails in some programs (e.g., IBM® Notes®) may remain stored for a long period of time, as it may be difficult to detach file attachments or delete calendar invitations without compromising the ability to keep invitations on a calendar. For example, if a user sends a calendar invitation email with a large attachment, and a recipient user may want to keep the invitation on his or her calendar and delete the actual email, but the system may be configured such that if the recipient user deletes the email, the invitation may also be deleted from the calendar. Accordingly, recipient users may be unwilling to delete calendar invite emails, which may mean that these emails may be likely to be stored above a threshold time period and therefore become costly.

In some embodiments, determining a particular email cost may include determining the specific file attached to the email message. For example, email messages with image-based or video-based attachment files (e.g., JPEG or Moving Picture Expert Group (MPEG) files) may incur a higher cost than text-based files (e.g., Word), as these attachments may utilize valuable network bandwidth or throughput, require a large quantity of processing power, and/or use a large quantity of storage space.

In operation 312, a server computing device program module may identify an email message size and the number of recipients the email message will be sent to and calculate the cost estimate accordingly. For example, the size of an email message that includes a 10 MB message may correspond to a cost of 20 when sent to one recipient. However, when the 10 MB message is sent to 5 recipients, the cost of 20 may be multiplied by 5 to account for the five recipients to arrive at a cost of 100.

In operation 314, a server computing device module may generate an overall cost estimate. In some embodiments, the overall cost estimate may be generated by adding each of the costs, as specified above for process 300 (e.g., adding the costs of operations 308, 304, 306, 302, 316, and 312). For example, operation 308 cost may be 5, operation 304 cost may be 5, operation 306 cost may be 3, operation 302 costs may be 5, operation 316 costs may be 5, and operation 312 costs may be 20. Accordingly, the overall cost in operation 314 may be 43 (5+5+3+5+5+20=43). In some embodiments, any individual cost (e.g., operation 304 cost) may override or conclusively determine the overall cost. For example, in operation 304, if it is determined that the sending user is a director of communications within his or her company, all of the other cost calculation variables (e.g., cost estimates from operations 308, 306, 302, 316, and 312) may not be utilized for generating an overall cost estimate, as any email of a director of communications may be sent regardless of other costs. In some embodiments, operation 314 may be performed by generating a cost estimate of a few of the operations specified in process 300, or more (or different) operations than those specified in the process 300.

Figure 4:
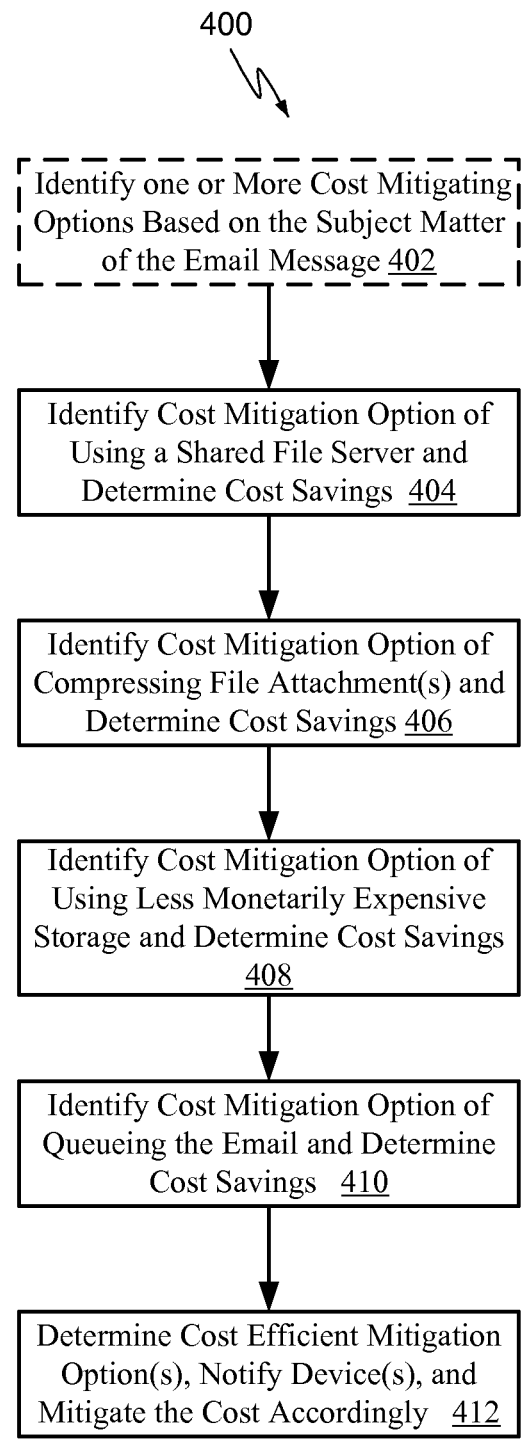
FIG. 4 is a flow diagram of an example process for identifying a plurality of cost mitigation options, determining a costs savings quantity for each of the mitigation options, and selecting one or more of the mitigation options to mitigate the cost accordingly, with respect to embodiments.

FIG. 4 is a flow diagram of an example process for identifying a plurality of cost mitigation options, determining a costs savings quantity for each of the mitigation options, and selecting one or more of the mitigation options to mitigate the cost accordingly, with respect to embodiments. Process 400 may be the result of determining that an email cost exceeds a cost threshold (e.g., operation 206 of FIG. 2). Although the process 400 illustrates that one or more cost mitigating options may be identified based on the subject matter of the email message (operation 402), in some embodiments, the subject matter of the email message may not be dispositive in identifying a cost mitigation option. For example, a set of cost mitigating options (e.g., operations 404, 406, 408, and 410) may be determined as a part of a predetermined set of rules, and one or more of the cost mitigation options may be selected by a server computing device program module only when certain rules are met. For example, one rule may be that any email sent between 8 a.m. and 10 a.m. that exceeds a cost threshold should be queued (e.g., per operation 410).

Process 400 may start when a server computing device program module (e.g., an NLP module) within server computing device analyzes the content of the email message to determine a subject matter of the email message and in response to the analyzing, the server computing device may perform operation 402 to identify at least one cost mitigation option. For example, a server computing device using NLP may be utilized to perform operation 404 to identify the cost mitigation option of using a shared file server. The computing device file server may be a server that provides central storage (e.g., a common server storage computing device) for at least two recipient users. In an illustrative example, a program module (e.g., for NLP) may determine that the content of an email is regarding a status update and if the estimated cost of sending the email is above the cost threshold, then an associated server computing device may suggest that the email message be posted to a team room status page (or may directly route the email to a team status page). A status update may be an email that is sent to all team members of a business unit regarding a particular project and at regular intervals (e.g., once a week). For example, a team of engineers may receive a plurality of build verification test (BVT) result emails of an ongoing project. In some embodiments, a program module, such as an NLP module, may search for key words within the email to flag for mitigation options or routing purposes, such as "status update," "BVT," etc. Accordingly, instead of storing duplicate data on a server, the data may only be stored once to a shared server. In some examples, if any of these key words are utilized, a server computing device program module may determine that operation 404 is the most cost efficient mitigation option (operation 412), as discussed herein, and mitigate the cost accordingly.

In some embodiments, using the above example, indicia may be displayed to the MUA of the sending user (e.g., within the header, or as a pop up screen) to inquire if the user would like to post the email message to a shared web page (e.g., that may correspond to a shared file server), which may save a specified amount of money. In some embodiments, the inquiry may include a corresponding link to the shared forum or server. In various embodiments, the server computing system may not provide operation 404 as an option for the user to select, but rather may specify that this is the only action the user can take. In some embodiments, the server computing device may specify that instead of routing the email (which may include a large attachment) to the specified recipients, the email was routed to a shared file server. In these embodiments, the server computing device may automatically perform the cost mitigation operation (e.g., operation 212 of FIG. 2). In these embodiments, each specified recipient may receive an email specifying that the corresponding attachment may be found via a specified link.

In operation 406, a server computing device program module may identify the cost mitigation option of compressing one or more file attachments and determine the cost savings accordingly. In some embodiments, compression may be based on synthesizing several files that a user may send into one file. This may both reduce the size of the mail message (e.g., 1 GB reduced to 2 MB) and reduce network costs, as viewing several uncompressed files by a recipient user may take several minutes. Compressing file attachments may be performed in various manners. For example, a program module or operating system may compress file attachments via "zipping," "archiving," or through other suitable methods. Various compression techniques may depend on the file type. In an illustrative example, a program module within a server computing device (e.g., an NLP module) may find key words utilized in the email message, such as "attachment," "video," etc. and specify to a user that a cost mitigating option may be to compress the file attachment associated with the email message—which may be a costly MPEG video file. In some embodiments, a computing device server may provide compression as a potential option to a user to mitigate the cost. In other embodiments, the computing system server may take compression into account along with other cost mitigation options and determine a cost savings before actually mitigating the cost. For example, a server computing device may determine that because the attachment is a 5 MB PDF file, the cost savings for compressing the email message attachment may be very little (e.g., save 2 dollars).

In operation 408, a server computing device program module may identify the cost mitigation option of using less monetarily expensive storage and determine cost savings accordingly. In some embodiments, if the cost of sending the email message is above a cost threshold and due primarily to monetary storage costs, then a cost mitigation option may be to store the email to a less monetarily expensive server computing device. In an illustrative example, if a server computing device identified that the main cost of sending a particular email being above a cost threshold was due to high monetary storage costs, and that the employee was an entry level employee with little to no need for email communications, then a server computing device may determine the cost savings to be ideal for using less monetarily expensive storage. Alternatively, if the email message was sent by a CEO and the cost was not determined to be mainly the result of monetary storage costs, then the costs savings may not be as high. As discussed above, this cost mitigation option may either be provided as an option for a user to select, or the server computing device module may select this option, without user feedback, and each user may be notified accordingly.

In operation 410, a computing device program module may identify the cost mitigation option of queueing the email message and determine the cost savings accordingly. In some embodiments, queueing the email message may delay sending the email at a particular time such that the email message may be sent during times in which network bandwidth may not be as costly. For example, if an email message is sent during peak business hours (e.g., between 8 a.m. and 5 p.m.) and if network bandwidth is expensive during the peak business hours (or there is very little network bandwidth available), queueing the email message may be identified as an option and may provide increased cost savings. In some embodiments, this option may be provided to a user and corresponding indicia may specify whether the user would allow the email to be queued for transmission until network bandwidth is more available, or the network charge drops to a cheaper rate, such as after business hours. In other embodiments, a server computing device module may unabatedly select this option to mitigate the cost without user feedback.

In operation 412, and in some embodiments, a server computing device program module may select a cost efficient mitigation option, notify one or more computing devices of the option chosen, and mitigate the cost accordingly. For example, the server computing device module may calculate a cost savings quantity of some or all of the process 400 cost mitigation options (i.e., operations 404, 406, 408, and 410), compare each operation's cost savings quantity, and select the option with the highest cost savings to mitigate the cost. In an illustrative example, a new employee with an occupational role that requires a low quantity email communication may decide to send an email message with an 8 MB PDF file attached to 20 people. The new employee's company may incur large monetary storage costs. The computing device program module may determine that the cost of sending the email, which may be 90 dollars, is above a cost threshold (e.g., $70). The server computing device program module may determine the cost savings for using a common file server (operation 404) to be 5 dollars. The cost savings for compressing the file attachment (operation 406) may be 8 dollars. The cost savings for using less monetarily expensive storage (operation 408) may be 20 dollars. And the cost savings for queueing the email may be 15 dollars. Accordingly, in embodiments, the server computing device program module may select the cost mitigation option of using less monetarily expensive storage, as it saves the highest quantity of money. In these embodiments, the server computing device may notify one or more user computing devices that the cost mitigation option of using less monetarily expensive storage was selected in order to mitigate the cost of sending the email. In other embodiments, the server computing device may provide the different cost savings that corresponds with each mitigating option to a user such that the user may select the desired cost saving mitigation option.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
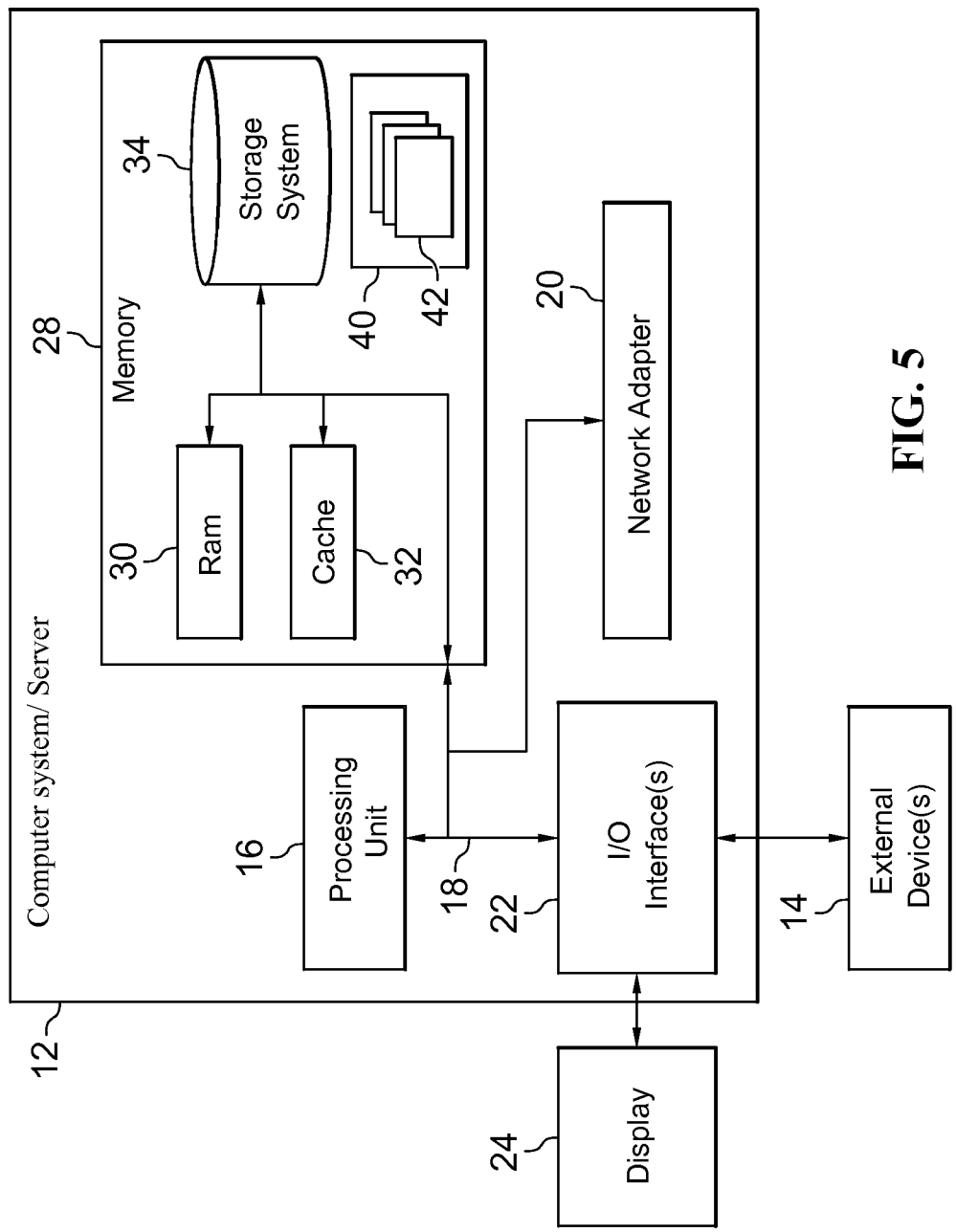
FIG. 5 depicts a cloud computing node according to embodiments of the present invention.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
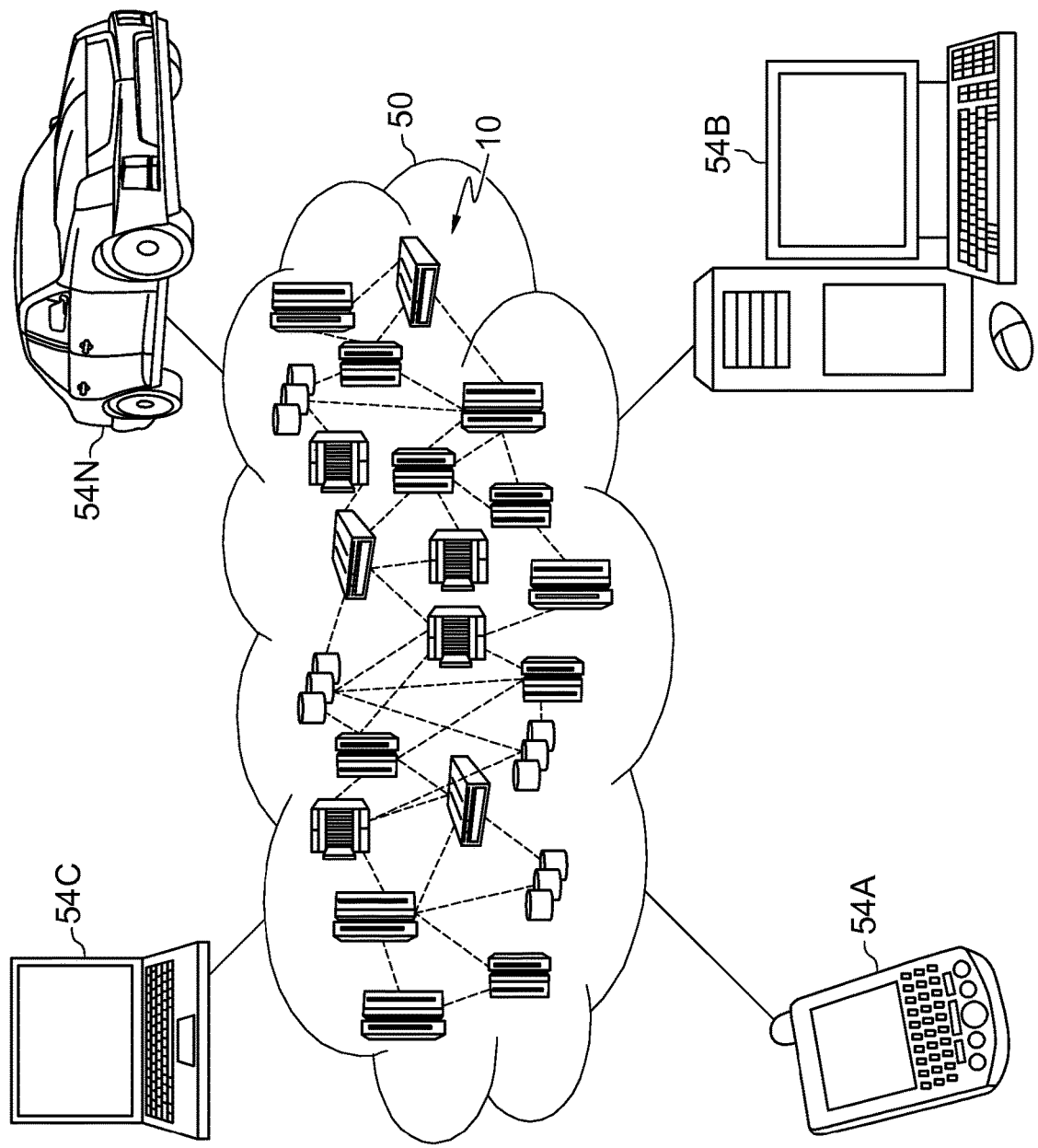
FIG. 6 depicts a cloud computing environment according to embodiments of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
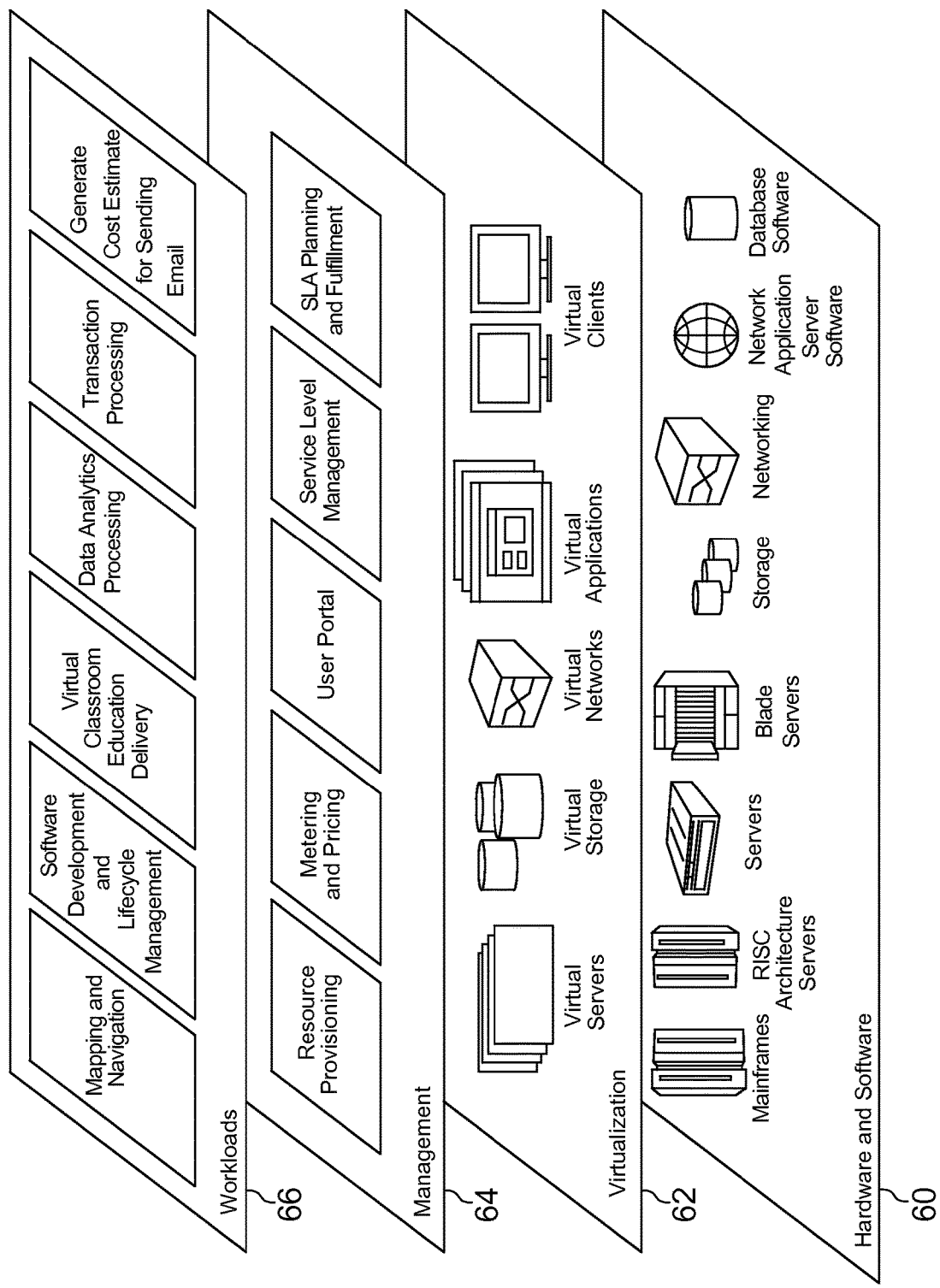
FIG. 7 depicts abstraction model layers according to embodiments of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and generating a cost estimate for sending an email message 96.

Aspects of the present invention may be a system, a method, and/or a computer program product. The computer program product may include a computer readable storage medium (or media) having computer readable program instructions thereon for causing a processor to carry out aspects of the various embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method comprising:
analyzing, using natural language processing (NLP), content of an email message to determine a subject matter of the email message, wherein the subject matter includes a theme;
generating a subject matter cost estimate, based on the subject matter of the email message being within a category of subject matter types;
generating an overall cost estimate for sending the email message based on at least the subject matter cost estimate;
comparing the overall cost estimate to a cost threshold; and
determining, based on the comparing, that the overall cost estimate exceeds the cost threshold,
wherein the generating the overall cost estimate is further based on determining, based on the subject matter, that the email message is likely to be stored above a threshold time period for at least one recipient of the email message.

2. The method of claim 1, further comprising:
identifying, in response to the determining that the overall cost estimate exceeds the cost threshold, at least a first cost mitigation option and a second cost mitigation option, the first and second cost mitigation options for use in mitigating the cost of sending the email message;
determining a first cost savings quantity of the first cost mitigation option and a second cost savings quantity of the second cost mitigation option;
comparing the first savings quantity with the second savings quantity;
selecting the first cost mitigation option, based on the comparing and upon determining that the first cost savings quantity is larger than the second cost savings quantity, to mitigate the cost of sending the email message; and
notifying one or more user computing devices that the first cost mitigation option has been selected to mitigate the cost of sending the email message.

3. The method of claim 1, further comprising identifying, in response to the determining that the overall cost estimate exceeds the cost threshold, one or more cost mitigation options based on the subject matter of the email message.

4. The method of claim 1, further comprising:
providing, in response to the determining that the overall cost estimate exceeds the cost threshold, a plurality of cost mitigation options for display; and
in response to the providing, receiving a user request to perform at least one of the plurality of cost mitigation options.

5. The method of claim 1, wherein the overall cost estimate is further based on an occupational role of a sending user and an occupational role of each recipient of the email message.

6. The method of claim 1, wherein the analyzing is in response to a user performing an action indicating an intent to send the email message, the method further comprising:
generating the overall cost estimate for sending the email message further based on an occupational role of a sending user and an occupational role of each recipient of the email message;
identifying, in response to the determining that the overall cost estimate exceeds the cost threshold, a plurality of cost mitigation options based on the subject matter of the email message;
determining a cost savings quantity for each of the cost mitigation options;
providing the plurality of cost mitigation options for display and providing the cost savings quantity for each of the cost mitigation options for display; and
in response to the providing of the plurality of cost mitigation options, receiving a user request to perform at least one of the plurality of cost mitigation options.

7. The method of claim 1, wherein the subject matter of the email message further includes an email message topic.

8. The method of claim 1, wherein the subject matter of the email message further includes an email message purpose.

9. The method of claim 1, wherein the generating the overall cost estimate for sending the email message is further based on opportunity costs.

10. The method of claim 9, wherein the opportunity costs include time a recipient of the email will spend waiting for an attached file to download in order to view the file.

11. The method of claim 9, wherein the opportunity costs include time a recipient of the email spends managing his or her email account.

12. The method of claim 1, wherein the cost threshold is a predefined acceptable cost depending on dynamics surrounding the email message.

13. The method of claim 1, wherein the overall cost estimate for sending the email message is further based on a time of day the email is to be sent.

14. The method of claim 2, wherein selecting the first cost mitigation option is performed by a server computing device.

* * * * *